UNITED STATES PATENT OFFICE 2,165,747

METHOD OF PREPARING SECONDARY ARYL AMINES

Elmer William Cook, New York, N. Y., assignor to Tide Water Associated Oil Company, Bayonne, N. J., a corporation of Delaware No Drawing. Application March 17, 1937, Serial No. 131,452

10 Claims. (Cl. 260—576)

The present invention relates to processes for preparing secondary aryl amines and more particularly, in its more specific aspect, to processes for preparing dinaphthylamines through the interreaction of a naphthylamine and a naphthol in the presence of a small quantity of a catalytic material.

Of the three dinaphthylamines well known to the art there are two of the so-called symmetrical type, namely, alpha-alpha-dinaphthylamine and beta-beta-dinaphthylamine, having the following structural formulae respectively:

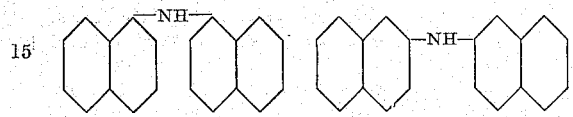

and one of the unsymmetrical type, alpha-beta-dinaphthylamine having the following formula:

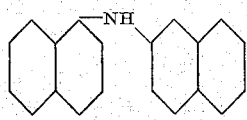

Both symmetrical and unsymmetrical dinaphthylamines have been heretofore prepared in a variety of ways, one of the earlier commercial processes involving the reaction of ammonia and a naphthol in the vapor phase, and in the presence of a catalyst, to form the two symmetrical dinaphthylamines, alpha-alpha-dinaphthylamine and beta-beta-dinaphthylamine. In this process a mixture of a naphthol and ammonia, both in the vapor state, is passed through long tubes heated from 300° C. to 500° C., the tubes containing a catalytic material distributed upon a conventional carrier. To those skilled in the art it is manifestly obvious that such a process is extremely expensive, first because of the necessity of providing a particular type of catalytic tube and secondly because of the additional expense of making the specially prepared catalytic material. Then, too, the tubes become clogged up within a short time due to tar formation and the apparatus must be taken down, the tubes cleaned and replaced with fresh catalytic material.

Later and more successful processes for the preparation of dinaphthylamines employ the reaction between a naphthylamine and a naphthol in the presence of various catalysts, and this general reaction is well known to the art.

The most commonly used catalyst for this reaction is of the dehydrating type, such as anhydrous calcium chloride or anhydrous zinc chloride. Processes employing such dehydrating catalysts, however, have the disadvantages of comparatively low yields and relatively impure products. An additional disadvantage in the use of zinc chloride resides in the circumstance that this compound hydrolyzes during the condensation reaction with resultant evolution of hydrogen chloride. The catalytic effectiveness of the zinc chloride is thereby diminished. To a lesser degree, a like condition obtains when calcium chloride is used.

Iodine has also been suggested and employed as a catalyst in reacting naphthols and naphthylamines in the preparation of dinaphthylamines. It is necessary, however, to employ specially constructed apparatus when using iodine as a catalyst and the use thereof has therefore been more or less abandoned because of this prohibitive expense.

More recent investigators in this particular art have used strong acids, such as hydrochloric, sulphuric, and phenol sulfonic. While it is doubtless true that the use of these strong acids constitutes an improvement over the prior processes employing calcium chloride, zinc chloride, or iodine as catalysts, there are numerous disadvantages to the use of strong acids. In the first place, there is an excessive tar formation and the product is invariably off-color. Secondly when using concentrated sulphuric acid there is the danger that the reactants or the end product, or even both, may be sulfonated at some point during the reaction. Furthermore, the use of strong acids necessitates acid proof reaction chambers of expensive construction.

One of the objects of the present invention, therefore, is to provide a readily controlled process for the preparation of dinaphthylamines in a high yield and of high purity, the main reaction of which process goes nearly to completion.

A further object is to provide such a process in which side reactions and tar formation are minimized and in which the use of expensive equipment is obviated.

It has been found that naphthalene sulfonic acids act as extremely efficient catalysts in the reaction between a naphthylamine and a naphthol. Only very small quantities of the naphthalene sulfonic acid need be present in the reaction mixture, it having been found that approximately 2.5% naphthalene sulfonic acid, based upon the total weight of reactants, will result in a 96% yield of light-yellow, crystalline dinaphthylamine. The percentage of naphthalene sulfonic acid catalyst may, however, be varied within certain limits and good results may be obtained through the use of 0.5% to 10% naphthalene sulfonic acid.

It has been further found that in the general reaction between a naphthol and a naphthylamine, the naphthalene sulfonic acid used as the catalyst preferably should have a substituent orientation which corresponds to that of the particular naphthol undergoing reaction, i. e., the sulfonic acid group of the naphthalene sulfonic acid bears the same orientation relation to its naphthalene nucleus as does the hydroxyl group of the naphthol. For instance, in the preparation of the unsymmetrical alpha-beta-dinaphthylamine by the reaction between beta-naphthol and alpha-naphthylamine, preferably beta-naphthalene sulfonic acid should be used as a catalyst. On the other hand, when preparing the symmetrical alpha-alpha-dinaphthylamine by reacting alpha-naphthol with alpha-naphthylamine, preferably alpha-naphthalene sulfonic acid should be employed as the catalyst. Similarly, in preparing beta-beta-dinaphthylamine from beta-naphthol and beta-naphthylamine, preferably beta-naphthalene sulfonic acid should be employed.

In carrying out the reaction, substantially molal proportions of the naphthol and naphthylamine are used. It is desirable to avoid an excess of naphthol and it is therefore preferable to use a slight excess of the naphthylamine.

The following example, which is merely illustrative of the general process and which should not in any way be considered a limitation thereof, is here set forth to show the applicability of the process to the preparation of alpha-beta-dinaphthylamine:

50 grams of beta-naphthol and 55 grams of alpha-naphthylamine, (representing a slight molal excess of the latter), together with 3 grams of beta-naphthalene sulfonic acid, are heated for 1½ hours at 410° F., water being continuously removed by distillation or evaporation. With no additional application of heat the reaction is allowed to proceed and, at the end of another hour, the temperature rises to 520° F. and the reaction is completed. After cooling, benzene is added and the resulting solution extracted with a caustic soda solution for the removal of residual beta-naphthol and catalyst. The solution is then further extracted with dilute hydrochloric acid to effect removal of residual alpha-naphthylamine. A small amount of decolorizing charcoal is then added to the benzene solution and the mixture filtered through paper to remove any tar that may have formed in the reaction. The filtrate is evaporated to drive off the benzene, after which the alpha-beta-dinaphthylamine is crystallized and washed two or three times with petroleum naphtha. The resultant product has a melting point of 105° C., which compares favorably with the theoretical melting point of 110° C. The crystals were of light yellow color and the yield approximately 96%.

It will be obvious to those skilled in the art that the conditions of the process may be varied within certain operative limits without departing from the scope of the invention which is to be measured only by the following claims:

1. A process for preparing alpha-beta-dinaphthylamine which comprises reacting alpha-naphthylamine with beta-naphthol in the presence of beta-naphthalene sulfonic acid.

2. A process for preparing alpha-beta-dinaphthylamine which comprises reacting alpha-naphthylamine with beta-naphthol, in substantially molal proportions, in the presence of 0.1–10% beta-naphthalene sulfonic acid.

3. A process for preparing alpha-beta-dinaphthylamine which comprises reacting alpha-naphthylamine with beta-naphthol, in substantially molal proportions, in the presence of approximately 2.5% beta-naphthelene sulfonic acid.

4. In a process for preparing dinaphthylamines by reacting a naphthylamine and a naphthol, the improvement which comprises carrying out the reaction in the presence of a naphthalene sulfonic acid.

5. In a process for preparing dinaphthylamines by reacting a naphthylamine and a naphthol, the improvement which comprises carrying out the reaction in the presence of a naphthalene sulfonic acid whose sulfonic acid group bears the same numbered position in the naphthalene nucleus as does the hydroxyl group of the naphthol employed.

6. In a process for preparing dinaphthylamines by reacting a naphthylamine and a naphthol at an elevated operative temperature and in substantially molal proportions, the improvement which comprises carrying out the reaction in the presence of a catalytic amount of a naphthalene sulfonic acid.

7. In a process for preparing alpha-beta-dinaphthylamine by reacting alpha-naphthylamine with beta-naphthol at an elevated operative temperature, the improvement which comprises carrying out the reaction in the presence of a catalytic amount of beta-naphthalene sulfonic acid.

8. In a process for preparing alpha-beta-dinaphthylamine by reacting alpha-naphthol and beta-naphthylamine at an elevated operative temperature, the improvement which comprises carrying out the reaction in the presence of a catalytic amount of alpha-naphthalene sulfonic acid.

9. In a process for preparing alpha-alpha-dinaphthylamine by reacting alpha-naphthol and alpha-naphthylamine at an elevated operative temperature, the improvement which comprises carrying out the reaction in the presence of a catalytic amount of alpha-naphthalene sulfonic acid.

10. In a process for preparing beta-beta-dinaphthylamine by reacting beta-naphthol and beta-naphthylamine at an elevated operative temperature, the improvement which comprises carrying out the reaction in the presence of a catalytic amount of beta-naphthalene sulfonic acid.

ELMER WILLIAM COOK.